United States Patent Office 3,323,107
Patented May 30, 1967

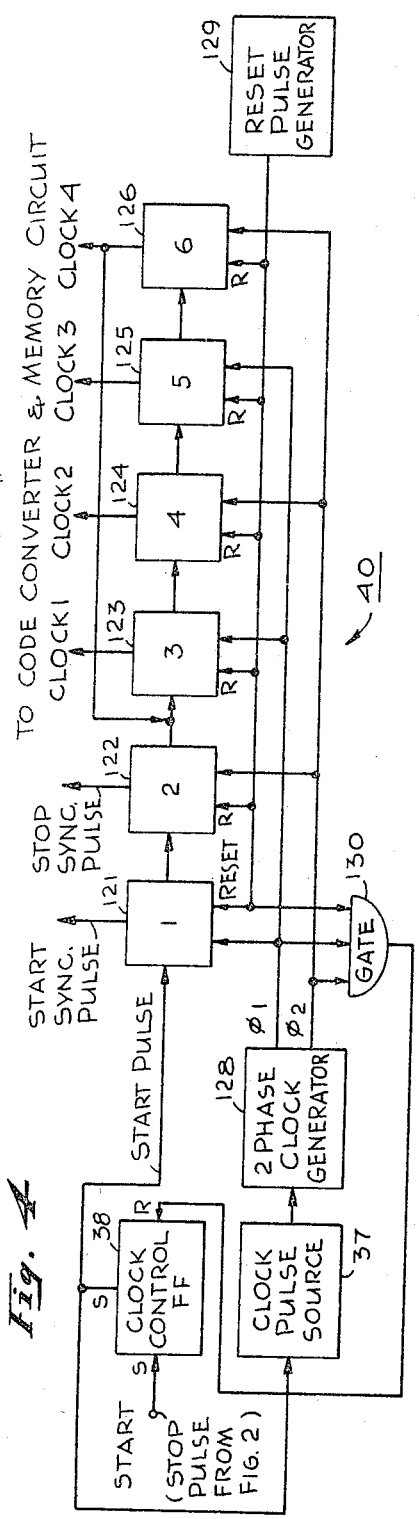
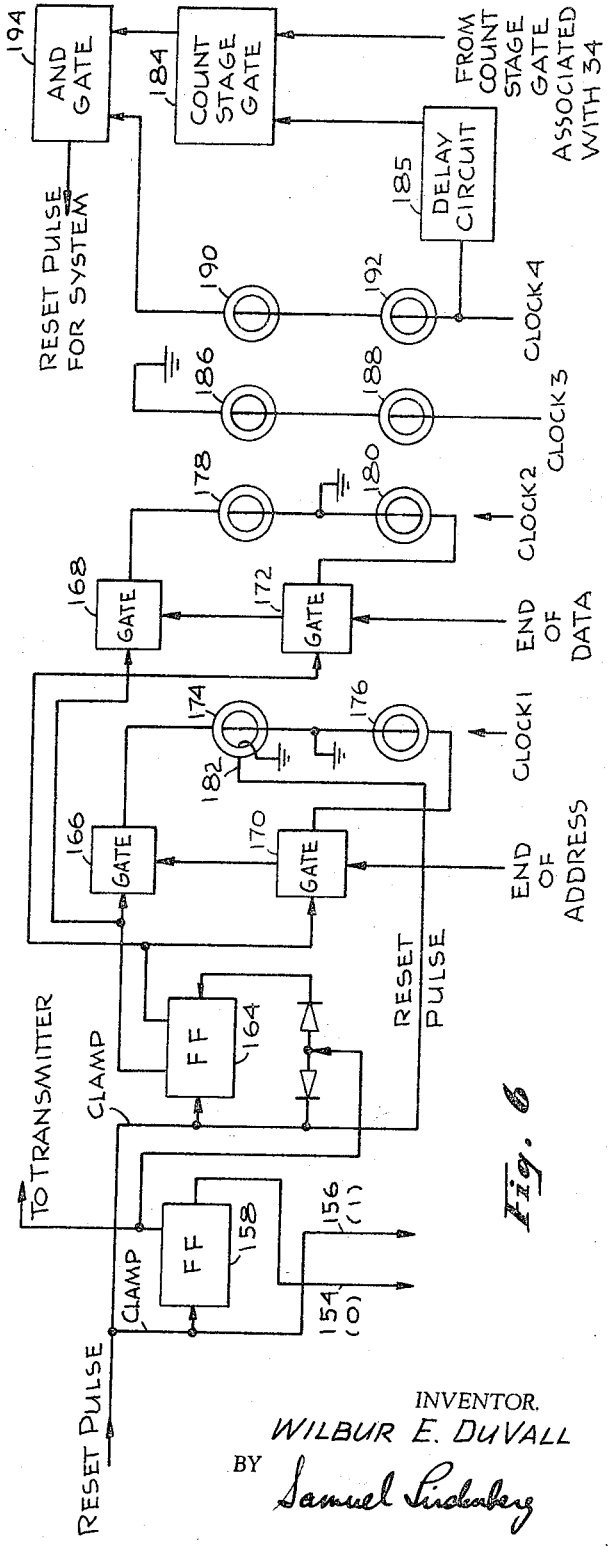

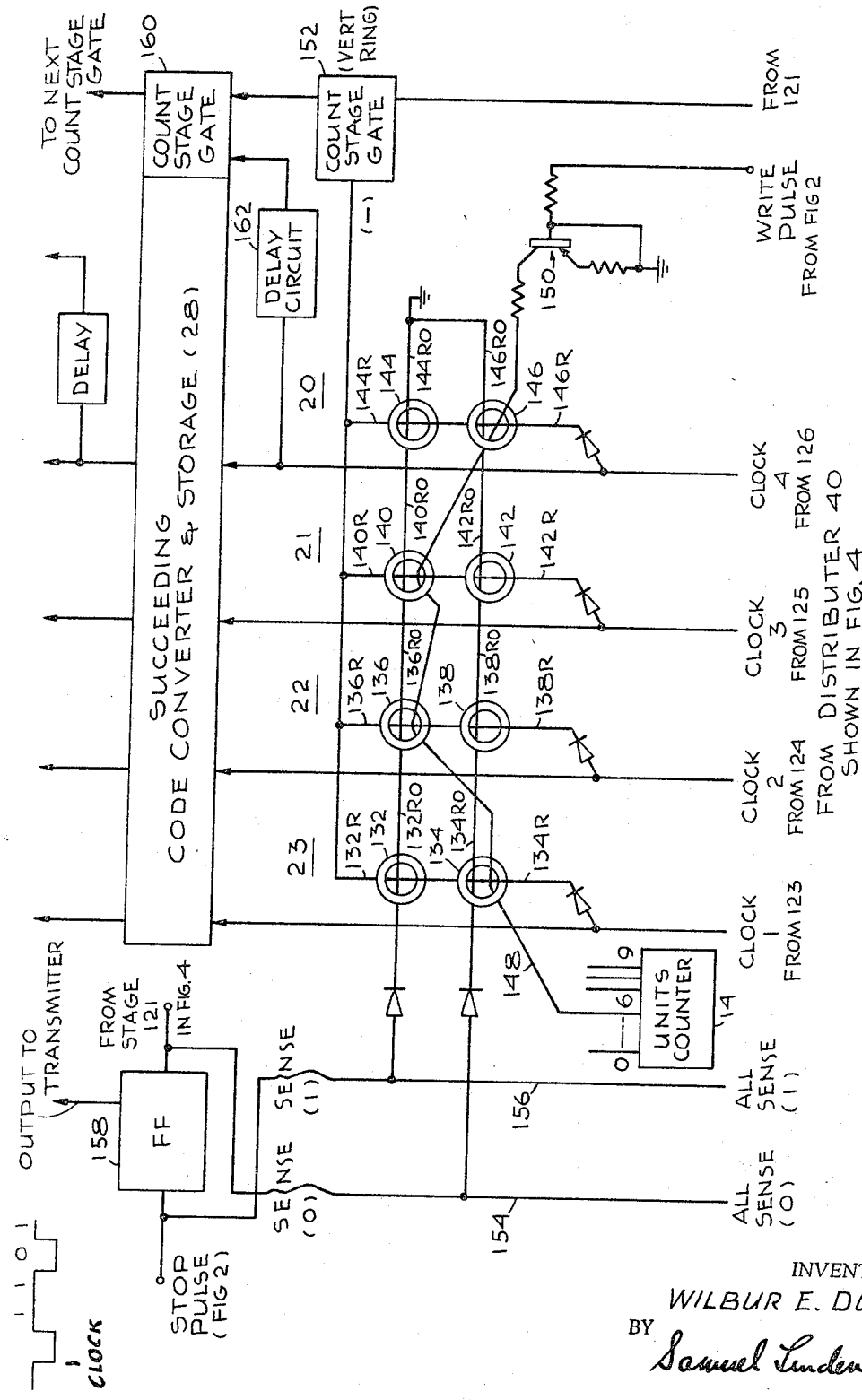

3,323,107
PLURAL STATION TELEMETERING SYSTEM RESPONSIVE TO CONDITION TO INTERRUPT SCAN UNTIL STATION INFORMATION IS TRANSMITTED
Wilbur E. Du Vall, Gardena, Calif., assignor, by mesne assignments, to The Electrada Corporation, Los Angeles, Calif., a corporation of Delaware
Filed Feb. 19, 1963, Ser. No. 259,639
6 Claims. (Cl. 340—147)

This invention relates to telemetering systems and more particularly to a system for rapidly scanning a large number of apparatus and for providing signals indicative of a defective apparatus.

An object of this invention is the provision of a novel system for scanning a large number of apparatus and providing signals indicative of defective ones of said apparatus.

Another object of this invention is the provision of an improved system for monitoring the state of a large number of apparatus and providing accurate information whereby a defective apparatus may be identified.

Yet another object of this invention is to provide a useful solid state system for monitoring the condition of a large number of apparatus, which system can be easily enlarged when required to handle an increase in the monitoring load.

Still another object of the present invention is to provide a solid state and compact system for monitoring the condition of a large number of apparatus.

These and other objects of this invention may be achieved in an arrangement wherein a counter is sequenced. The succeeding count outputs of the counter enable apparatus to successively scan the apparatus being monitored. A defective piece of apparatus stops the counter and initiates an operation whereby the count is used as the address of the defective apparatus and this address together with any desired associated information is converted to a code suitable for the transmittal and stored. A synchronizing pulse is generated and stored data is then read out serially, from the storage devices, and binary bits are added. The train of signals is then applied to a transmitter for transmittal to a receiving station.

The novel features that are considered characteristic of this invention are set forth with particularity in the appended claims. The invention itself, both as to its organization and method of operation, as well as additional objects and advantages thereof, will best be understood from the following description, when read in connection with the accompanying drawings, in which:

FIGURE 4 is a block diagram of a distributor counter used in the embodiment of the invention.

FIGURE 5 is a schematic diagram of a code converter and storage circuit used in the embodiment of the invention, and FIGURE 6 is a block diagram of a parity generator used in the embodiment of the invention.

Figure 1:
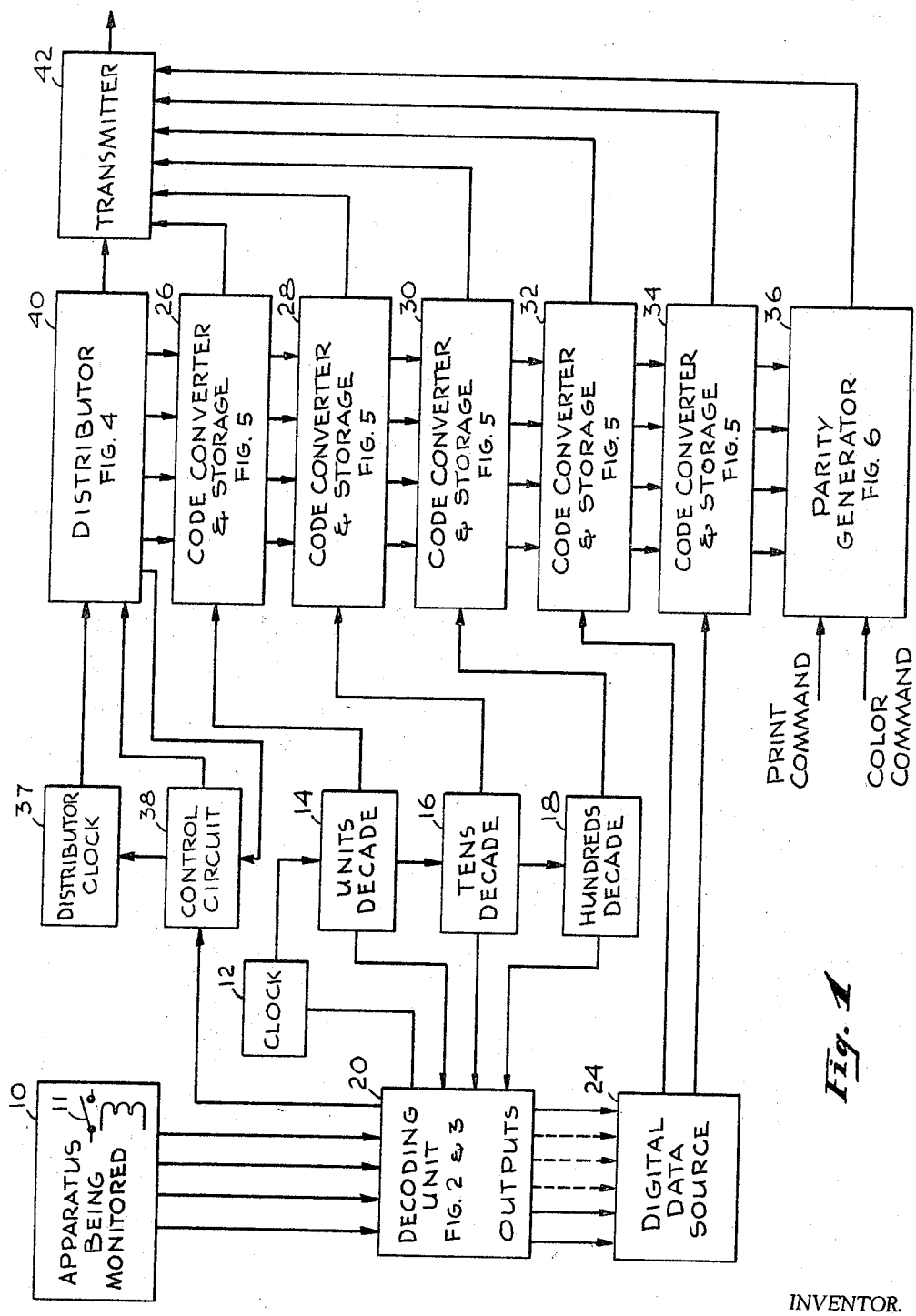
FIGURE 1 is a block diagram of the system in accordance with this invention.

The rectangle labeled "apparatus to be monitored 10," includes a plurality of various different devices each of which is made to indicate its state of operability by a relay contact pair 11. When the relay contacts are closed then the apparatus is known to be in good operating order. When the contacts are open then the apparatus may be considered to be signalling for attention. There is no limit to the amount of equipment which can be monitored by this apparatus.

For the purposes of this explanation, it will be assumed that it is desired to monitor 1000 different pieces of equipment. In accordance with this invention, a clock 12 is started. The output of the clock advances a decimal counter consisting of a units decade 14, a tens decade 16, and a hundreds decade, 18. As the counter advances sequentially through its count it causes a decoding unit 20, to which the counter outputs are applied to successively test the state of each of the switches associated with the apparatus 10 which is being monitored. Should the decoding unit determine that a switch is open, then the decoding unit applies a signal to an associated one of its plurality of outputs. There is a separate output associated with each piece of apparatus being tested. The output which is energized corresponds to the apparatus which had the open switch condition. All of the outputs of the decoding unit are applied to a digital data source 24. All of the outputs of the decades of the counters are also applied to respective code converter and storage circuits respectively 26, 28, and 30.

The decoding unit 20, upon sensing the presence of an open switch, causes the clock 12 to stop counting long enough for the digital data source 24 to produce an output in response to the energized one of the inputs, to produce data which is associated with the address of the defective apparatus as represented by the decimal count in the decades 14, 16 and 18. The digital data source 24 and the units tens and hundreds decades effectively enter and store their information into the respective code converters and memory circuits 26, 28, 30, 32 and 34. Upon completion of the storage operation a distributor clock 37 is energized through a control circuit 38. This clock applies its output to a distributor 40 and the control circuit 38 also applies its output to the distributor 40. The distributor, in response to the clock 37 first produces a synchronizing pulse and then proceeds to read out the data stored in storage circuits 26 through 34. At this point is should be noted that the decimal input from the decade counter 14, 16 and 18 is converted into a binary-coded-decimal form by the stages 26, 28 and 30 of the memory. The distributor 40 sequences the readout from the storage so that it appears as a serial train of pulses. First is a synchronizing pulse, followed by pulses representing the address in binary coded decimal form of the apparatus which requires attention. Thereafter, there are pulses which are a binary-coded representation of digital data associated with the apparatus in difficulty. The end of the pulse train consists of two parity bits.

The parity generator 36 provides these two parity bits. One parity bit is obtained by checking the binary coded decimal address. If the number of binary ones add up to an even amount then no parity bit is added. If the binary ones add up to an odd amount then a parity pulse is inserted. The parity generator 36 similarly checks the digital data and adds a parity pulse if the total number of ones in the digital data train does not equal an even amount. If desired, after the two parity bits there may be two control signal bits. In an embodiment of the invention which was built and operated, one of these bits represented a command to the receiving apparatus to commence printing, and the other of these bits represented a color command to the printer, to determine whether the print was to be in red or black.

The outputs from the storage and the parity generator are applied to the transmitter 42. After the last pulse from the parity generator 36, a reset signal is generated which resets the entire system enabling it to continue with the monitoring or scanning and transmitting operation.

Figure 2:
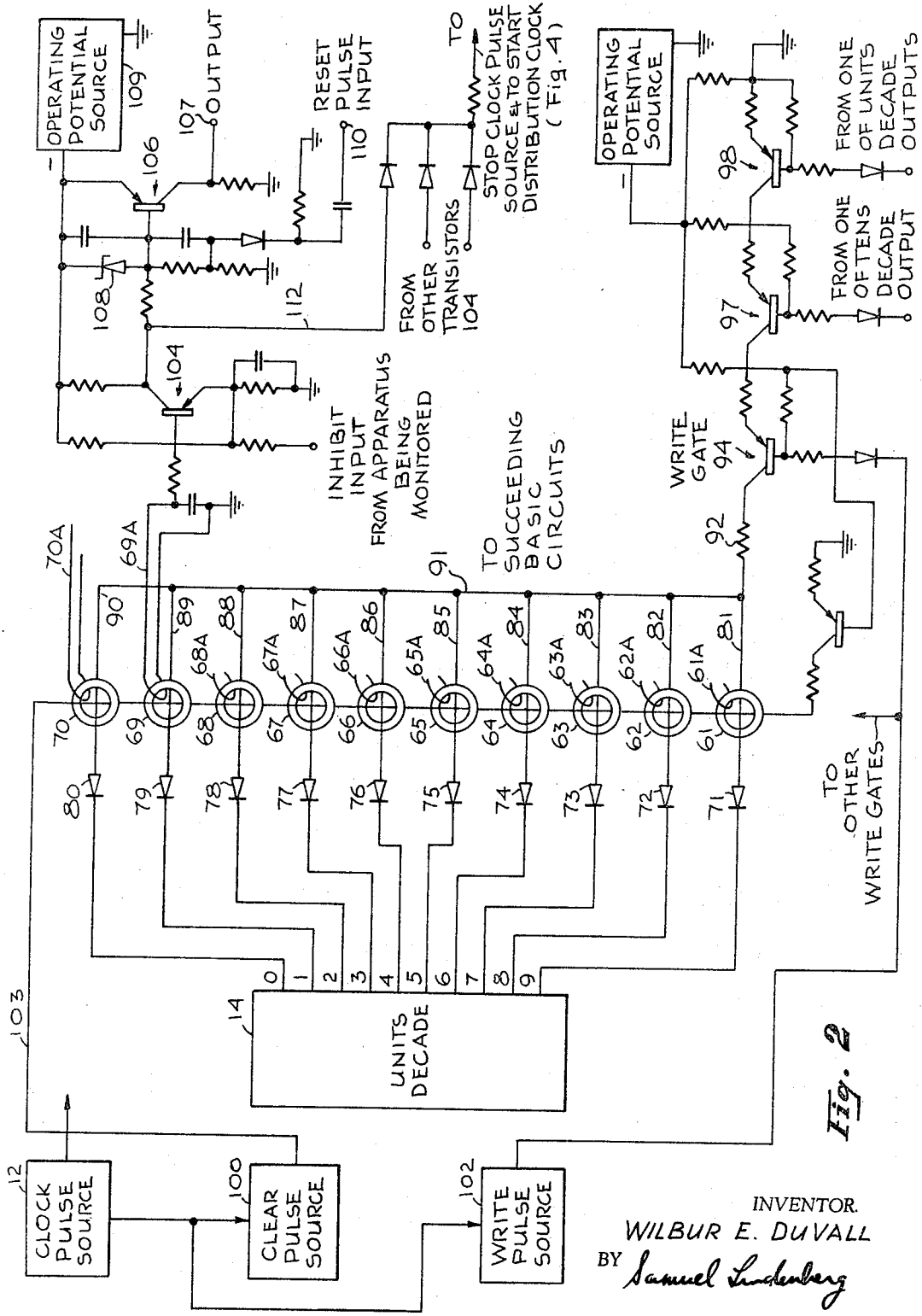
FIGURE 2 is a circuit diagram of a basic detecting circuit and decoding unit used in the invention.

Reference is now made to FIGURE 2, which shows a basic circuit used in the decoding unit 20. This basic circuit is required to be repeated 100 times in order to monitor 1000 pieces of equipment. A decoding unit operates in response to a count output of the decimal counter to check a different one of the circuits being scanned. Upon the occurrence of an open switch at a circuit being scanned, then an output is provided to the digital data source and also a signal is provided which initiates the recording of the address of the defective circuit, as well as the associated digital data. Thereafter, the apparatus can continue with the scanning operation.

The basic circuit includes 10 magnetic cores respectively 61 through 70. These ten cores are each connected to receive a different output from the units decade 14. This is applied through the respective diodes respectively 71 through 80, which are respectively connected to windings 81 through 90 which are inductively coupled on the respective cores. The windings 81 through 90 are all connected to a common bus 91. This bus is connected to a resistor 92 to the collector of a transistor 94. This transistor comprises a write gate. The base of the transistor 94 is connected to a write terminal 96 which receives an enabling write signal at the proper time. However, the write signal alone does not make the transistor conductive unless the two other gating transistors respectively 97 and 98 are enabled. Transistor 97 has its collector connected to the emitter of transistor 94. Transistor 98 has its collector connected to the emitter of transistor 97. The emitter of transistor 98 is connected through a resistor 99 to ground. The enabling signals, which are required to be applied to the bases of transistors 97 and 98, are respectively received from one count output of the tens decade 16 and from one count output of the one hundreds decade 18. From the foregoing description it should therefore be clear that the transistor 94 cannot become conductive unless the tens and hundreds decades have reached the count state to which the bases of transistors 97 and 98 are connected.

As previously described, each time that the clock pulse source 12 advances the counter, a clear pulse and a write pulse are then generated. This is provided by a clear pulse source generator 100 which is driven from the clock pulse source and a write pulse source generator 102 which is also driven from the clock pulse source. These pulse sources are driven serially. Accordingly, the timing of the pulses is such that, first the clock pulse source 12 advances the counter. Next, the clear pulse source 100 applies its output to drive a clear bus 102 which is inductively coupled to every single core in the decoder. Since only one core in the entire decoder has been written into by the immediately preceding count output of the counter, that core is driven to its clear state. After the operation of the clear pulse source 100, the write pulse source 102 applies a write pulse to the terminal 96. This terminal is connected to all the write gates in the decoder. However, since only one tens gate and one one hundreds gate have been enabled then only one write gate is permitted to become conductive whereby only one core is written into by the present count output. This is the core connected to the enabled write gate and to the stage of the units decade indicative of the count which has been attained.

Assume now that core 69 has been written into. Each one of the cores has an output winding respectively 61A through 70A. For core 69 this output winding is given reference numeral 69A. Each one of the output windings is connected to a separate detecting circuit. Only one of these is shown, connected to winding 69A. From the description of this one, the manner of connection of the others, and operation of the system will be clear, it is believed.

At the time of the writing into a core a voltage is induced in the output winding coupled thereon. This voltage is applied to the base of the succeeding output gate transistor 104. However, this transistor is maintained nonconductive by an inhibit bias applied over terminal 105 to its emitter if the apparatus being monitored has its monitoring switch closed. If this switch is open the transistor 104 no longer has an inhibit bias applied thereto. As a result, in response to the voltage induced on the winding 62A transistor 104 will amplify this signal and apply it to a succeeding transistor 106. This is the output transistor. Transistor 106 output applied to terminal 107 signals the fact that the apparatus whose address is at present in the decade counter is defective. This output is applied to the digital data source 24 in order to enable it to emit the required information to the transmitter. By reason of the signal received from the transistor 104 a tunnel diode 108 which is connected between the base of transistor 106 and the source of operating potential 109 is triggered into its high voltage state whereupon it maintains transistor 106 clamped in its conductive state. Therefore, transistor 106 will remain clamped until a rest signal is applied to its base from a terminal 110 whereby the tunnel diode is forced back to its low voltage state and transistor 106 is turned off.

The output taken from the collector of transistor 104 is also applied to a common bus 112 which connects this signal to effectuate a stopping of the clock pulse source 12 until the rest of the transmitter has had a chance to record the address and the aforementioned data.

Summarizing the foregoing, each one of the basic circuits consists of 10 cores. Each one of these 10 cores is associated with a different output of the units counter. The 10 cores are driven by a write gate when that write gate receives an enabling output which consists of a write pulse as well as the enabling or conduction of two associated transistor gates. These transistor gates are respectively associated with one output of the ten's decade and the unit's decade.

Figure 3:
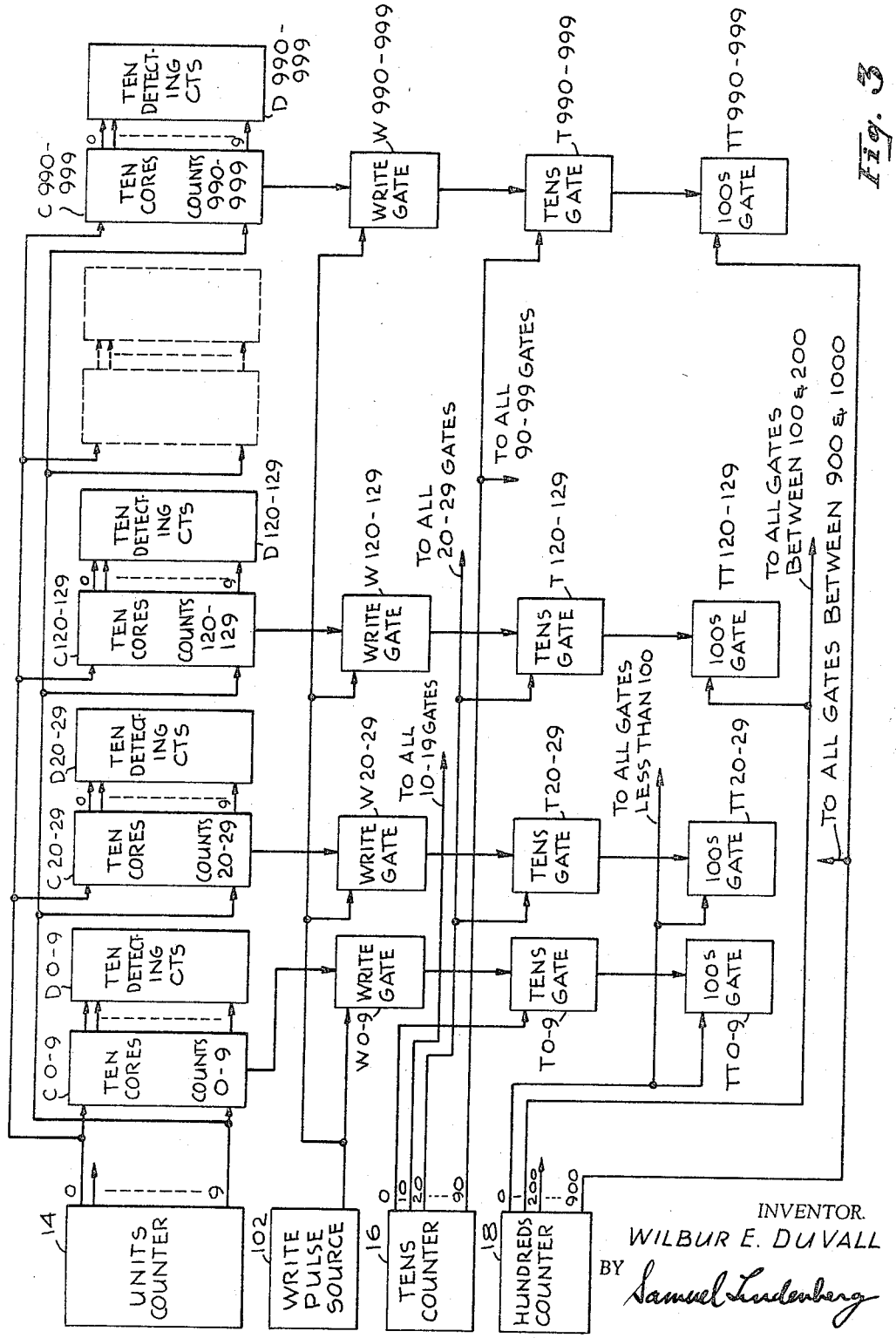
FIGURE 3 is a block diagram of the entire decoding unit arrangement used in the embodiment of the invention.

FIGURE 3 shows a schematic circuit of the organization of the decoding unit. It was previously pointed out that 100 of the basic circuits are required for monitoring 1000 separate pieces of equipment. Only four of these are shown in conjunction with the counters but it is believed that a description of the operation of these will be sufficient to enable one to understand and construct the entire system.

The ten outputs of the unit counter are respectively coupled by drive windings to correspondingly positioned cores in all the ten core groups respectively C0–9, C20–29, C120–129 and C990–999. The designations given to the ten core groups represent the counts that they handle. The ten drive windings for each of the respective ten core groups are respectively connected to respective write gates W0–9, W20–29, W120–129, and W990–999. The write pulse source, at the proper time applies a write pulse to all of these gates.

Write gate W0–9 is not energized however, unless the ten's gate T0–9 is enabled (by the ten's counter 16 being in its zero count state) and the hundred's gate TT0–9 is enabled (by the hundred's counter being in its zero count state). The zero count output of the ten's counter is applied to all of the ten's gates which are assigned to counts 0–9 in the entire decoding unit, i.e. 100–109, 300–309, 700–709, etc. The zero count output of the hundred's counter is applied to all hundred's gates which are assigned to count less than 100.

When the write gate W0–9, ten's gate T0–9 and hundred's gate TT0–9 are all enabled then a core in the group C0–9 is written into, depending on the unit counter count, as was described in connection with FIGURE 2. The core write pulse is also applied to the associated detecting circuit with the results also described in connection with FIGURE 2.

For the counts 20–29, a single ten's gate T20–29 is provided which is enabled by the ten's counter output corresponding to the count of 20. The associated hundred's gate TT20–29 is enabled by the zero count output of the hundred's counter. While the ten's and hundred's counters are in their respective twenty and zero count states the unit counter runs through counts zero through nine.

The count 120–129 is handled by the ten cores C120–C129, the ten's gate T120–129 which is enabled when the ten's counter "20" count output is present, and by the hundred's gate TT120–129 when the hundred's counter "100" count output is present. The ten's counter "20" count output is applied to all gates which are associated with counts including 20–29. The hundred's counter "100" count output is applied to all gates which are associated with counts between 100 and 199 inclusive. It is believed that the manner of connection between counters and gates should be clear from the above.

The operation of this portion of the system may be most clearly described by using an illustration. Assume that apparatus at address 127 is defective. Accordingly, the switch which is being scanned at that location is open. This removes an inhibit signal which is continuously applied to the decoding unit by reason of these switches being closed.

The clock pulse source 12 advances the counter consisting of decades 14, 16, 18, to its next count. This is the aforementioned count 127. At this time the transistor gate TT120–129 corresponding to the one in the hundreds decade, and the gate T120–129 which receives the "20" output from the ten's decade have enabling signals applied thereto. This is followed by a clear pulse which clears the ten cores associated with the numbers 120 through 129. Thereafter, a write pulse is applied to the write gate W120–129. This pulse then enables the core in the group C120–129 corresponding to number seven to be written into. In response to a signal being written into magnetic core number seven, an output is applied to a succeeding gate which is open only when no inhibit signal is being applied thereto. This occurs when the switch corresponding to the address which has been attained by the counter is open. This succeeding gate provides an output signal which may be considered as a stop signal. This stop signal is applied to a succeeding transistor which blocks any further change in output significant of difficulty with apparatus 127 until the condition has been corrected. This will remain locked up until a reset signal is applied to the locked up transistor to clear it. The scanning operation can continue. However, no further change will be noted in the output corresponding to apparatus 127.

FIGURE 4 is a block diagram of the distributor 40 and of the circuits 37 and 38 shown in FIGURE 1. Effectively, the distributor comprises a six stage counter within which four stages constitute a ring counter. The six stages of the ring counter are respectively designated as 121, 122, 123, 124, 125 and 126. Each of the stages may constitute a binary device such as a magnetic core, or a flip-flop circuit which are arranged in well known manner to provide a counting sequence. The stop pulse which is generated by the detecting circuitry shown in FIGURE 2 is applied to the clock control circuit 38. This is a flip-flop circuit. The clock control circuit is driven to its set state wherein it applies a pulse to the clock pulse source 37 to cause to cause this clock to start to emit pulses. The clock control circuit 38 also applies its output to the first stage 121 of the counter to drive it to its one state.

The output of the clock pulse source 37 is applied to a two phase clock generator 128 to obtain a two phase clock output. This two phase clock generator may be a continuously driven flip-flop circuit. The two phase clock generator outputs are respectively applied to the odd and even stages of the counter. As a result, the counter advances the one which has been inserted into its first stage. Thus, in response to the first or odd pulse output of the two phase clock generator, stage 121 transfers its output to stage 122. In response to the second or even pulse output of the clock generator, stage 122 transfers its output to stage 123. This progression occurs until the one which was inserted into the counter is transferred to the last stage. The last stage then reintroduces this one into the third stage of the counter, over a feedback line 127 coupling the last and third stages.

The operation of the counter 40 as a cyclic counter for its last four stages should now be apparent. The outputs from the last four stages of the counter are applied to the code converter and memory circuits 26 through 34 to the parity generator 36, shown in FIGURE 1. The output of the first stage 121 of the counter is used to end a sync pulse which is initiated by the stop pulse. The output of the stage 122 of the counter is used to provide a space between the trailing edges of the sync pulse and the first information bit to be transmitted. A coincidence gate 130 is used for the purpose of resetting the counter upon the completion of its operations. This gate requires both the input of a reset pulse from a source 129 and either a phase one or a phase two clock pulse, to provide an output. Its output is applied to the clock control circuit 38 to reset this flip-flop circuit whereby the operation of the clock pulse source 37 ceases further operation. The derivation of the reset pulse will be shown subsequently herein. The reset pulse also serves to reset all stages of the counter to their zero count state.

Reference is now made to FIGURE 5 which exemplifies the circuitry for each of the code converter and storage devices respectively represented by the rectangles 26 through 34 in FIGURE 1. Each of these circuits comprises eight magnetic cores. Two magnetic cores are assigned to represent a binary one or a binary zero in one of the digit locations $2^0$, $2^1$, $2^2$, and $2^3$, within the binary decimal code. Thus, a first pair of cores respectively 132, 134 represent a digit in the $2^3$ position. A second set of cores respectively 136, 138 represent a digit in the $2^2$ position. A third set of cores 140, 142 represent a digit in the $2^1$ position and a fourth set of cores 144, 146 represent a digit in the $2^0$ position.

The magnetic cores 132 to 146 are of the type having a substantially rectangular hysteresis characteristic with two states of magnetic remanence. When driven to one of these states they represent the presence of a binary bit and when to its other, the absence. The arrangement shown in FIGURE 5 is to provide two cores to represent a binary bit. Cores 132, 136, 140, and 144 when driven to a predetermined one of their states represent a one in the respective digit positions. Cores 134, 138, 142 and 146 when driven to the predetermined one of their states represents a zero in the respective digit positions.

Assume now, that it is desired to convert a number, let us say 6, to a binary coded decimal representation. The number 6 is represented by 0110. This means that there will be a one stored in the $2^2$ and the $2^1$ positions and a zero stored in the $2^0$ and the $2^3$ positions. Accordingly, a line from the "six" representative output of for example, the units decade 14, will be coupled to the core 134 (corresponding to a zero in the $2^3$ position), thereafter it couples to the core 136 (corresponding to a one in the $2^2$ position). The line then couples to core 140 (corresponding to a one in the $2^1$ position) and thereafter to core 146 (corresponding to a zero in the $2^0$ position). The line thereafter connects to the collector of a writing gate transistor 150. The write gate 150 is energized by the stop pulse which is generated by the circuitry shown in FIGURE 2.

To briefly review what happens in the system, it will be recalled that the counters 14, 16, and 18 were stopped when an open switch was detected. The output of this counter consists of ten lines from the unit's decade, ten lines from the ten's decade and ten lines from the hundred's decade. Each of the ten lines from the unit's decade threads through the eight cores in the code converter and memory circuits 26, details of which are shown in FIGURE 5, in a manner to be able to store the units count in a BCD form when an open switch is detected. Ten lines from the tens counter threads through the set of cores in the code converter and storage 28 in a manner, the details of which are also represented by FIGURE 5, to store the tens count in BCD form. Similarly, each of the ten lines from the hundreds counter threads through the set of cores in the code converter and memory 30 to be converted into the binary decimal coded representation when the open switch is detected. Accordingly, when the defective apparatus is detected, a stop pulse is generated. This stop pulse enables a write transistor 150 (see FIG. 5) one of which is provided for each one of the code converters and storage circuits, to be energized, whereupon the counter output can drive the four pairs of cores to the magnetic states which represent the binary coded decimal representation of the decimal count in the associated counter.

Simultaneously, with the writing in of the count of the counter, digital data from the source 24 is also written into the remaining two sets of eight cores in the storage devices 32 and 34 to provide any information which it is deemed necessary in addition to the address of the defective apparatus.

Referring again to FIGURE 5, each of the cores besides the decoding lines, has a clear winding and a read out winding. Each two of the read windings, respectively 132R to 146R, for the cores in each digit position, are connected in series with each other and then to a count stage gate 152. Each two clear windings are successively driven by the outputs from the distributor 40. All of the output windings 132RO, 136RO, 140RO and 144RO for the "one" representative cores are connected in series and then to a "one" sense line 156. All of the output windings 134RO, 138RO, 142RO, 146RO, of the "zero" representative cores are connected in series and then to a "zero" sense line 154. The "zero" and "one" sense lines connect to all of the output windings of the remaining code converter and storage stages in the same manner as is shown here.

The stop pulse generated in the circuit shown in FIGURE 2, as has been indicated, causes the clock pulse generator of the distributor to be energized. As a result, after an interval which is the interval required for the counter shown in FIG. 4 to advance to its third count state, a signal is applied, designated as clock 1 from the distributor in FIG. 4, to the series connected pair of read out windings, respectively 134R, 132R, which are inductively coupled to the respective cores 134 and 132. These readout windings are also connected to a count gate stage 152. They will only pass current to drive these cores to their clear states if and only if, the count gate stage 152 has been enabled. Count gate stage 152 is enabled by the output from count stage 121 of the counter 40 shown in FIG. 4. Since core 134 was driven to its set state when the coding winding 148 was energized by the units counter, an output will be induced in the readout winding 134RO coupled to core 134. This output is applied to the zero sensing line 154. When the counter 40 provides a second clock output from stage 124 then a readout drive is applied to cores 138 and 136, over their respective windings 138R and 136R. In response to this an output voltage is induced on the winding 136RO which is connected to the "one" sensing line 156. The sensing line 154, is coupled to all the readout windings on all the zero representative cores in all of the code converter and memory circuits. The sensing line 156 is coupled to all the readout windings on all the one representative cores in the code converter and memory.

From the foregoing description it should be apparent how the distributor successively applies pulses to drive the cores of the code converter and memory 26 to reset these cores, whereby either a one or a zero representative output in sequence is applied to the sensing lines respectively 154 and 156. These sensing lines drive a flip-flop circuit 158. The output of the flip-flop circuit 158 comprises a pulse train representative of the binary coded decimal digit which has been stored in the code converter and memory circuit 26. It should be noted that the flip-flop 158 is initially set in response to the stop pulse derived from the circuitry shown in FIGURE 3. The flip-flop is then driven again in response to the first pulse output from stage 121 of FIG. 4. As a result, the first output from the flip-flop 158 comprises a sync pulse as shown in the waveshape diagram of this flip-flop circuit in FIG. 5. Thereafter, after an interval is determined by the time taken to drive the stage 122 of the counter 40, the flip-flop 158 will begin to produce a pulse train representing the address of the defective apparatus which has been detected.

It was previously described that the readout drive from the cores, in response to pulses from the distributor, is effected only when a count stage gate 152 associated with the particular code converter and memory circuit being driven is energized. The count stage gate 152 is a binary type stage of a counter established as follows. Each one of the code converter and storage circuits 26 through 34 includes one of these stages. The fourth clock pulse of the distributor 40 is applied to a delay circuit 162. Because of this delay circuit, readout from the fourth pair of cores can occur before the succeeding count stage gate 160 associated with the succeeding code converter and storage unit is enabled. Each of the count stage gates after the first (152) requires the enabled output from the preceding count stage gate and the output from a delay circuit 162 to become enabled. The first count stage gate is enabled by the output from the last stage 121 of the counter 40.

From the foregoing description it should be apparent how the distributor together with the count stages 152, 160, etc., are sequenced to derive from the code converter and memory circuits 26, 28, 30, 32, 34, the information which is stored therein. This information is applied to the transmitter 42, and also to the sensing lines 154, 156.

FIGURE 6 shows a parity generator which is employed in this system. On FIGURE 6 so much of FIG. 5 is reproduced as to enable the orientation of the circuit shown therein with FIG. 5. The output of flip-flop of 158 is used to drive another flip-flop 164. This flip-flop is driven from it set to its reset state in response to the successive outputs of flip-flop 158. As a result, if flip-flop 164 has an initial starting state, upon the termination of the application of pulses thereto, one can determine by its final state whether or not an odd or an even number of pulses was applied to flip-flop 164. Therefore flip-flop 164 can be designated as a parity indicating flip-flop. The output of flip-flop 164 when in its odd indicating state, is applied to two gates, respectively 166 and 168.

The output of flip-flop 164, when in its even parity indicating state, is also applied to two gates, respectively 170, 172. These gates, however, require a second input before they can provide an output. The output of gate 166 is employed to set a magnetic core 174. The output of gate 170 is employed to set a core 176. The output of gate 168 is employed to set a core 178, the output of gate 172 is employed to set a core 180. The second required input to the gates 166 and 170 is provided by an end of address signal which is derived from the count stage gate output associated with the last code converter and memory circuitry 30. The gates 168 and 172 are enabled upon the end of the data entry into the digital data source, which is provided by the count stage output, associated with the code converter and memory 34. From the foregoing it will be noted that when either an end of address or an end of data signal occurs one of the two gates 166, 170, or 168, 172, will be open. The open one of these two gates is determined by the output state of the parity flip-flop 164. Therefore, one of the magnetic cores 174 or 176 is driven to represent the parity state of the address which has been read out of the code converter and memory and one of the cores 178 and 180 will be driven to store the parity state of the data which has been read out of the code converter and memory.

An output winding 182 is inductively coupled to core 174. Upon the occurrence of a write operation to the cores 174, 176, at the "end of address," a voltage is induced in this output winding which is applied to reset flip-flop 164 to be in a proper initial state to determine parity for the data binary information which is next to be stepped out of the code converter and memory circuits.

The arrangement for the magnetic cores and the parity generator is identical with the arrangement described for the magnetic cores in the code converter and strorage circuits in their coupling to receive outputs from the distribution counter 40 and also in their association with a count stage gate 184. That is, the second parity bit is written into the parity generator at the termination of the digital data signal readout, at which time the succeeding count stage 184 is enabled through a delay circuit 185, from the fourth clock from the distributor counter. The count stage 184 then enables the distributor counter 40 to read out the contents of the parity cores 174 through 180 and also to readout the contents of cores 186, 188, 190, 192, which respectively store any other desired information such as starting the printer, and the color of printing signals. The readout from all of these cores is applied to the sense lines 154, 156, as before. The output of the flip-flop 158 at this time, consists of the complete pulse train which includes the address, digital data, parity pulses and control signals for a particular piece of equipment which has been detected as being defective. The combination of the output of the count stage 184 and the fourth count on the distributor counter is applied to an and gate 194. This and gate is the reset pulse generator and the output of this and gate comprises the reset pulse which is applied to the distributor shown in FIG. 4 to reset the apparatus.

Since the apparatus which has been described herein employs magnetic cores and transistors, the apparatus is solid state and therefore can be made extremely compact. Also, in view of the use of magnetic cores, read in and read out time into the memory is minimal and therefore the apparatus has a very high speed capability. It can operate at high bit rates. The equipment also lends itself to expanding to handle more apparatus by the simple expedient of inserting the basic circuits which have been described, where needed. The receiver for this equipment need simply be apparatus which can receive the binary coded decimal information and utilize it as needed. No special equipment need be provided for this since receivers for binary coded decimal information and the decoding thereof are well known.

There has accordingly been described and shown herein a novel, useful, highspeed and high capability telemetering transmitter.

I claim:

1. A system for monitoring the condition of a plurality of apparatus each of which provides an inhibit signal when in an acceptable condition and does not provide an inhibit signal when in a nonacceptable condition, said system comprising a counter, means for sequencing said counter through its successive count states, a plurality of detecting circuits a different one of which is associated with a different count state and a different one of said apparatus, means for applying the inhibit signal from a different one of said apparatus to its associated detecting circuit to maintain said detecting circuit inoperative, means responsive to each count state of said counter to apply a signal to the associated detecting circuit to render said detecting circuit operative if the inhibit signal from the associated apparatus is not present, means responsive to output from an operative detecting circuit to prevent further operation of said means for sequencing, storage means coupled to said counter, means responsive to said operative detecting circuit output for entering the count of said counter into said storage means, means responsive to said operative detecting circuit output for sequentially deriving signals representative of said count from said storage means for transmission purposes, and means responsive to said means for sequentially deriving signals from said storage means terminating its operation for rendering said means for sequencing said counter operative again.

2. A system for monitoring the condition of a plurality of apparatus as recited in claim 1 wherein said counter comprises a decimal counter, and said storage means includes magnetic means for connecting a decimal count to a binary coded decimal code.

3. A system for monitoring as recited in claim 1 wherein said counter comprises a decimal counter having a unit count output and higher order count outputs, said means responsive to each count state of said counter to apply a signal to the associated detecting circuit comprises a separate magnetic core means for each unit count in said counter, and a separate gate for each of the higher order counts in said counter, each of said separate gates being connected to one of said counter higher order count output to be enabled thereby, a separate drive winding for each unit output of said counter, each said separate drive winding being inductively coupled to a different one of said magnetic core means, each said drive winding being connected between the unit count output of said counter associated with the magnetic core means to which said winding is coupled and a common bus, means connecting said common bus to one of said separate gates for driving one of said magnetic core means when said counter attains the count state at which output is applied from said counter to said one of said separate gates and to said one of said drive windings, a different output winding coupled to a different one of said magnetic core means to have a voltage induced therein from said magnetic core means when it is driven, and means for coupling each different output winding to a different one of said detecting circuits.

4. A system for monitoring the condition of a plurality of apparatus each of which provides an inhibit signal when in an acceptable condition and does not provide an inhibit signal when in a non-acceptable condition, said system comprising a decimal counter having more than one decade, means for sequencing said counter through its successive count states, a plurality of detecting circuits a different one of which is associated with a different count state of said counter and a different one of said apparatus, means for applying the inhibit signal from a different one of said apparatus to its associated one of said detecting circuits to maintain said detecting circuit inoperative, means responsive to each count state of said counter to apply a signal to the associated detecting circuit to render said detecting circuit operative if the inhibit signal from the associated apparatus is not present, means responsive to an output from an operative detecting circuit to prevent further operation of said means for sequencing, storage means coupled to said counter including four separate magnetic core means for each decade of said counter, each four magnetic core means being associated with a decade, winding means coupling each counter decade to an associated one of said four magnetic core means for storing a count output from a decade into its associated four magnetic core means as a binary coded decimal representation thereof, gate means coupled to said winding means, means for applying an operative detecting circuit output to said gate means to enable entry of the count of said counter into said storage means, a distributor counter, means responsive to said operative detecting circuit output for initiating operation of said distributing counter, means to apply output from said distributor counter to said magnetic core means of said storage means for deriving a binary coded decimal signal train representative of the count stored in said storage means, and means coupled to said distributing counter and to said means for sequencing and responsive to said distributing counter finishing the derivation of said binary coded decimal signal train for terminating further operation of said distributor counter and for initiating further operation of said means for sequencing said counter.

5. A system for monitoring as recited in claim 4 wherein said counter includes a units decade and higher order decades and wherein said means responsive to each count state of said decades of said counter to apply a signal to the associated detecting circuit to render said detecting circuit operative comprises a plurality of groups of magnetic cores, the number of groups being determined as the total number of apparatus to be monitored divided by ten, there being ten cores in each group, each of the ten cores in each group being associated with a different count state of said units decade of said counter, a separate common bus for each group of cores, a drive winding for each core in a group, each said drive winding being inductively coupled to its core and having one end connected to receive output from the units decade of said counter at the count state with which it is associated and the other end connected to the common bus for that group of cores, a plurality of groups of count gates for each higher order decade of said counter, there being ten groups of count gates per decade, each count gate group including as many count gates as there are magnetic core groups, means connecting all the count gates in a group to a different count output of the associated decade to be enabled thereby, wherein said means connecting in series the common bus of each core group with a count gate in a group for each decade for driving a magnetic core is driven only when said counter attains the count state at which output is applied to the drive winding on said core and to each of the count gates connected in series with the common bus to which said drive winding is connected, a separate output winding coupled to every one of said cores, and means connecting each of said output windings to a different one of said plurality of detecting circuits.

6. A system for monitoring as recited in claim 4 wherein each said four magnetic core means comprise four pairs of cores each having a set and a clear state of magnetic remanence, one of a pair of cores representing a "one" binary bit when in its set state of remanence, the other of a pair of cores representing a "zero" binary bit when in its set state of remanence; said winding means coupling each counter decade to an associated one of said four magnetic core means comprises a separate winding for each count output of a decade each winding being connected to be driven by a different count output of said decade, each winding being coupled to the ones of the four pairs of cores associated with the decade which provide a binary representation of the decimal digit represented by the driving count output; said means to apply output from said distributor counter to said magnetic core means of said storage means for deriving a binary coded signal train representative of the count stored in said storage means includes a separate readout winding inductively coupled to each pair of the four pairs of magnetic cores for each decade, means for successively and in sequence applying driving currents from said distributor counter to the readout winding on each pair of the four pairs of magnetic cores, a first sensing winding connected to all of the "one" bit representative cores, a second sensing winding connected to all of the "zero" bit representative cores, a flip-flop circuit having two stable states, means for connecting said first and second sensing windings to said flip-flop circuit to drive it between its two stable states responsive to signals induced in said first and second sensing windings from said "one" and "zero" bit representative cores, and means to derive a signal train from said flip-flop circuit.

References Cited

UNITED STATES PATENTS

| | | | |
|---|---|---|---|
| 2,564,294 | 8/1951 | Belcher | 340—163 |
| 2,661,467 | 12/1953 | Jones | 343—5 |
| 2,762,014 | 9/1956 | Anderson | 340—213 |
| 3,214,734 | 10/1965 | Whitehead | 340—150 |
| 3,189,882 | 6/1965 | Ward | 340—147 |
| 3,234,533 | 2/1966 | Poli | 340—183 |

OTHER REFERENCES

Wright, R., "Collecting Data From Live Missiles in Flight," Electronics, Mar. 24, 1961, pp. 46–49.

NEIL C. READ, *Primary Examiner.*

A. J. KASPER, *Assistant Examiner.*